(12) United States Patent
Sassen et al.

(10) Patent No.: US 6,238,723 B1
(45) Date of Patent: *May 29, 2001

(54) EDIBLE FAT SPREAD

(75) Inventors: Cornelis Laurentius Sassen; Leendert Hendrik Wesdorp, both of Vlaardingen (NL)

(73) Assignee: Van den Bergh Foods Co., division of Conopco, Inc., Lisle, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/742,174

(22) Filed: Nov. 4, 1996

(30) Foreign Application Priority Data

Nov. 10, 1995 (EP) .................................. 95203058

(51) Int. Cl.⁷ ...................................................... A23D 7/00
(52) U.S. Cl. ............................................ 426/607; 554/227
(58) Field of Search ............................. 426/607; 554/227

(56) References Cited

U.S. PATENT DOCUMENTS

| | | | |
|---|---|---|---|
| 4,316,919 | * 2/1982 | Pelloso | 426/607 |
| 4,366,181 | * 12/1982 | Dykshoorn | 426/607 |
| 4,386,111 | * 5/1983 | Van Heteren | 426/607 |
| 4,396,639 | * 8/1983 | Bodor | 426/607 |
| 4,410,557 | * 10/1983 | Miller | 426/607 |
| 4,425,371 | * 1/1984 | Stratmann | 426/607 |
| 4,482,576 | * 11/1984 | Boot | 426/607 |
| 4,486,457 | * 12/1984 | Schijf | 426/607 |
| 4,501,764 | * 2/1985 | Gercama | 426/607 |
| 4,510,167 | * 4/1985 | Schmidt | 426/607 |
| 4,567,056 | * 1/1986 | Schmidt | 426/607 |
| 4,610,889 | * 9/1986 | Schmidt | 426/607 |
| 4,791,000 | * 12/1988 | Holemans | 426/607 |
| 5,587,195 | * 12/1996 | Sassen | 426/607 |

FOREIGN PATENT DOCUMENTS

| | | |
|---|---|---|
| 0078568 | 7/1985 | (EP) . |
| 92/20236 | 11/1992 | (WO) . |
| 95/07620 | 3/1995 | (WO) . |
| 95/13390 | 5/1995 | (WO) . |
| 95/30336 | 11/1995 | (WO) . |

OTHER PUBLICATIONS

Chemical Abstracts 110:171895.*
Chemical Abstracts 109:228944.*
Gunstone et al 1983 Lipids in Foods Chemistry, Biochemistry and Technology Pergamon Press New York p 152–154.*
Vol. 6, No. 2, 1995; Champaign US, pp. 152–157 "Transgenic Oilseed Harvests to Begin in May".
Vol. 5, No. 2, 1994; Champaign US, pp. 144–149 "Lauric Oil Sources: Some Old, Some New".
Vol. 54, J. Am. Oil Chemists' Soc., Mar. 1977; pp. 208A–210A "World Outlook for Soybean Production, Marketing".
Vol. 80, No. 5, Feitee, Seifen, Anstrichmittel, 1978; pp. 180–186 "A Method for the Determination of the Solid Phase Content of Fats Using Pulse Nuclear Magnetic Resonance".

* cited by examiner

Primary Examiner—Carolyn Paden
(74) Attorney, Agent, or Firm—Milton L. Honig

(57) ABSTRACT

A fat is provided hich is substantially free of trans saturated fatty acid residues and suitable for use in the preparation of a spread, which consists of an interesterified mixture of 30–90% of high lauric rapeseed oil, and 10–70% of an oil A comprising at least 40% of saturated fatty acid residues of which saturated fatty acid residues at least 80% are C16–C18 fatty acid residues and at most 60% are C16 fatty acid residues. The fat is used for preparing margarine fats and spreads. It provides low-trans and trans-free spreads with improved properties, while problems caused by slow crystallization are avoided.

11 Claims, No Drawings

EDIBLE FAT SPREAD

BACKGROUND OF THE INVENTION

1. Field of the Invention

The invention relates to an edible vegetable fat, substantially free of trans unsaturated fatty acid residues, to margarine fat comprising the fat and to edible fat spreads prepared with the margarine fat.

2. The Related Art

Edible fat spreads are products such as shortening, butter, margarine, halvarine, very low fat spreads, e.g. comprising only 20% fat and the like. Usually such products comprise a continuous fat phase in which the fat of the fat phase comprises liquid oil as well as a network of fat crystals which gives structure to the product. Such products do not need to contain an aqueous phase, but often they do and mostly the aqueous phase is present as a dispersed phase, distributed as small droplets in the continuous fat phase. However, fat spreads may also have a continuous aqueous phase. In such case, the fat phase may constitute a dispersed phase distributed finely in the continuous aqueous phase, or it may constitute a second continuous phase. If the spread comprises a continuous aqueous phase it typically includes hydrocolloids, i.e. gelling and/or thickening agents which contribute to the plasticity of the product.

Recent publications have stated that trans unsaturated fatty acid residues have an effect on blood cholesterol levels resembling that of saturated fatty acids (SAFA). This findings have created a consumer demand for products in which the content of trans fatty acid residues is at least considerably reduced, but preferably zero.

Suppliers of edible fat spreads responded rapidly to this new demand and reformulated existing products and introduced new ones in order to provide products having reduced levels of trans unsaturated fatty acid residues or even substantially trans-free products. Spreads without trans unsaturated fatty acid residues have been available for decades. Such spreads are rather soft products which need a chilled storage and which consistency is not appreciated by many consumers. The notably trans-free so-called health spreads therefore have served a relatively small market segment since the early sixties. Until recently, the majority of the vegetable spreads still contained a substantial amount of trans unsaturated fatty acid residues. Particularly for the firmer products, e.g. those meant for cooking and baking, the trans content could be as high as 40–50% of the fat, and even more.

The recent change-over to low or zero trans spreads has caused various problems such as increased brittleness, a poorer melt down behaviour in the mouth, a less good flavour release and serious structural defects, particularly graininess. As an effect of the changed fat composition some of the constituting fat has appeared to crystallize as coarse grains, which are unacceptable for a spread which ought to possess a smooth appearance and mouthfeel.

Further problems occurred in the manufacturing plants. The low or zero trans margarine fats tend to crystallize more slowly, which not only made the fats less plastic and more brittle, but also reduced the throughput of the spread production lines. This was necessary for allowing the spread more time to get a firm enough consistency. Obvious consequences were capacity losses, extra investments and increased costs for labour and energy.

Subsequently products have been developed with clearly improved sensorically perceivable product properties. But for such improvements generally the use of fat fractionation is required, which is a quite expensive processing technique, The influence of fat composition on the blood lipids profile, one of the main risk indicators for cardiovascular diseases, is expressed by the Keys Number (KN):

$$KN = C12{-}C16 + trans - 0.5 PUFA,$$

wherein "C12–C16" indicates the percentage (related to total fat) of saturated fatty acid residues with 12 to 16 carbon atoms, "trans" is the percentage of fatty acid residues containing one or more trans unsaturated double bonds and "PUFA" indicates the percentage of fatty acid residues containing 2 or more double bonds which should be all in the cis-configuration.

The earlier mentioned health spreads typically have a negative Keys Number, which means that they will typically have a beneficial effect on the blood lipids profile.

SUMMARY OF THE INVENTION

We have now found a substantially trans-free fat with a relatively low KN and with improved properties, particularly an acceptable firmness. It does not need to be fractionated, neither does it have a tendency to develop graininess and it crystallizes relatively fast. Spread products containing this fat are more plastic and less brittle than products prepared with low trans fats known from the prior art.

Accordingly, the invention provides an edible vegetable fat, substantially free of trans unsaturated fatty acid residues and which is suitable for the preparation of a spread. The fat consists of an interesterified mixture of 30–90% high lauric rapeseed oil and 10–70% of an oil A which contains at least 40% saturated fatty acid residues of which saturated fatty acid residues at least 80% are C16–C18 fatty acid residues and at most 60% are C16 fatty acid residues. The mixture preferably comprises 40–80% of high lauric rapeseed oil, which preferably is unhydrogenated.

The high lauric rapeseed oil preferably comprises 20–75%, more preferably 30–65% of lauric acid residues.

The oil A preferably comprises at least 60%, more preferably 80–100% of saturated fatty acid residues, of which preferably at most 40%, more preferably 0–30% are C16 fatty acid residues.

The invention further provides a margarine fat containing 0–10% trans unsaturated fatty acid residues of which fat 20–100% consists of the present fat, optionally up to 80% liquid oil and optionally up to 40% of another fat B.

The invention also comprises an edible fat spread comprising a fat phase and an optional aqueous phase. The triglyceride part of the fat phase consists essentially of the present margarine fat.

DETAILED DESCRIPTION

Throughout this specification, the terms "oil" and "fat" are used interchangeably, where oil generally denotes a fat in its liquid condition. Liquid oil means edible triglyceride oil which is free of solid fat at 20° C. and preferably still at 15° C. With fat are meant triglycerides, either as directly obtained from a natural source (single fat), or as the product of a process such as interesterification or blending.

Parts, percentages and proportions are expressed by weight unless indicated otherwise. Percentages fatty acid residues are indicated with respect to the total amount of fatty acid residues of the fat.

The solid fat content of a fat is indicated by N-values which can be measured according to Fette, Seifen, Anstrichmittel 80, 180–186, (1978). The necessary stabilisation is carried out by heating to 80° C., keeping at a temperature of at least 60° C. for at least 10 minutes, keeping for 60 minutes at 0° C. and keeping for 30 minutes at the measuring temperature.

Substantially free of trans unsaturated fatty cid residues means a content of less than 3%, preferably less than 1% trans unsaturated fatty acid residues. The fatty acid composition of a fat is measured by GLC analysis of fatty acid methyl esters (FAME) as described in e.g. EP 78568. The trans content of fat is measured as described in JAOCS 54, (1977), 208 as elaidic acid content. Margarine fat is the term used for the fat which forms the basis of the fat phase with which a spread is prepared. The margarine fat usually consists of a solid component, the hardstock, which gives the structure to the fat, and a liquid component, often vegetable oils.

Conventional rapeseed oil does not contain lauric acid residues in measurable amounts. Biotechnological developments have delivered varieties of rapeseed oil with elevated contents of lauric acid residues. WO 92/20236 gives examples of transformed Brassica plants, of which the seeds contain oil having lauric acid residue contents ranging from 12 to 51 mole %. Later developed oils contain even more lauric acid residues.

The high lauric rapeseed oil employed in the present invention preferably comprises 20–75 wt %, more preferably 30–65% lauric acid residues. The high lauric rapeseed oil preferably is unhydrogenated high lauric rapeseed oil and preferably is present in an amount of 40–80% in the mixture to be interesterified.

The type and amount of high lauric rapeseed oil is preferably chosen such that the interesterified mixture contains 7–40% and more preferably 10–32% of lauric acid residues.

The fat of the present invention is obtained by interesterification of high lauric rapeseed oil with an oil A. The oil A may be a single fat or it may be a blend of fats. In either case the oil A should comprise at least 40% saturated fatty acid residues (SAFA), and of this SAFA at least 80% should have a chain length of 16–18 carbon atoms while the content of C16, i.e. palmitic acid residues, in the SAFA should not exceed 60%. Preferably the SAFA content of oil A is 60–100%, more preferably 80–100%. The C16 content of the SAFA of oil A preferably is 0–40%, more preferably 0–30%, especially 0–20%. Oil A suitably is chosen from the group consisting of fully hydrogenated oils derived from soybean oil, rapeseed oil, cottonseed oil, sunflower oil, palm oil, palm oil stearin and/or fully hydrogenated components made from these oils or mixtures of two or more of them. Varieties of e.g. soybean or rapeseed oil with high stearic acid residue contents and fractions thereof can also be employed in or as oil A. Also some liquid oil can be incorporated in oil A. Fractions of high stearic acid residue containing oil varieties are less preferred because of the high costs of fractionation. Palm oil stearin, however, is available in abundancy at low cost because it is a byproduct of the production of palm oil midfraction and palm oil olein. The precise choice of fat or blend of fats for use as oil A is guided on the one hand by availability and price and on the other hand by the desired fatty acid composition according to the invention.

Oil A preferably comprises at least 80–100%, more preferably 90–100% of trans-free fatty acid residues having 16–18 carbon atoms in the chain, particularly palmitic (C16:0), stearic (C18:0), oleic (C18:1, cis), linoleic (C18,cis cis) and linolenic (C18:3, all cis) residues.

The interesterification is carried out either random or selective and using either a chemical catalyst or a biocatalyst, e.g. a lipase. Methods for interesterification are well known in the art. Preferably the interesterification is an enzymatic interesterification using a selective 1,3-lipase. Such reaction can suitably be carried out in a continuous manner using e.g. a packed bed reactor.

Preferably, the fat has a solid fat content as shown in Table I:

TABLE I

|  | Preferred | More Preferred |
|---|---|---|
| N10 | 30–90 | 40–85 |
| N20 | 15–60 | 20–55 |
| N30 | 2–30 | 2–20 |
| N35 | 0–15 | ≦8 |

The invention also comprises a process for preparing the present fat comprising the steps
a. preparing a mixture being substantially free of trans fatty acid residues consisting of
  i. 30–90% high lauric rapeseed oil, and
  ii. 10–70% of an oil A comprising at least 40% SAFA of which SAFA
    at least 80% are C16–18 fatty acid residues and
    at most 60% are C16 fatty acid residues,
b. interesterifying the mixture, and
c. recovering the interesterified fat The preferences above expressed with respect to the fat apply mutatis mutandis to the present process.

The present margarine fat or fat blend contains 0–10% and preferably 0–6% of trans unsaturated fatty acid residues. More preferably it is substantially trans-free.

The margarine fat blend may consist of the present fat, e.g. for making firm margarines or shortenings or it is a blend. Preferably the margarine fat blend has the composition shown in Table II:

TABLE II

| 20–90% (30–80%) | fat |
| 5–70% (20–60%) | liquid oil |
| 0–40% (0–20%) | other fat B | values between brackets are preferred.

Suitable liquid oils are: sunflower oil, low erucic acid rapeseed oil (low lauric), soybean oil, linseed oil, cottonseed oil and the like, high oleic acid residue containing varieties of such oils, groundnut oil and mixtures of 2 or more thereof.

In contrast to the liquid oil component, fat B contains solid fat at 20° C. Fat B may be chosen from a wide variety of fats: less preferred are palmkernel oil, coconut oil, palm oil, a fraction of such oil, a hydrogenated component made of such oil, an interesterified component of one or more of such oils, and mixtures of two or more thereof, because such components have an adverse effect on the KN of the product. More preferred fats B are hydrogenated high lauric rapeseed oil, high stearic acid residues containing soybean oil, sunflower oil and/or rapeseed oil varieties, fractions thereof and mixtures of two or more thereof are used. Most preferred fat B is fully hydrogenated high lauric rapeseed oil.

Fat B preferably has a slip melting point of 33–55° C., more preferably of 37–52° C. Fat B may consist of or includes partially hydrogenated fat, e.g. palm oil or palm olein hydrogenated to a slip melting point of 35–46° C., although partially hydrogenated fat is not preferred. In any case the maximum content of 10% trans acid residues in the margarine fat blend should not be exceeded. The amount of fat B in the margarine fat blend, if any, preferably does not exceed 25%. More preferably the amount of fat B in the blend is 0–20%. The constituting fats of the margarine fat blend are preferably chosen such that the resulting solid fat contents of the blend are as shown in Table III.

TABLE III

|  | Preferred | More Preferred |
| --- | --- | --- |
| N10 | 10–55 | 15–40 |
| N20 | 6–35 | 8–25 |
| N30 | 0.5–20 | 1–8 |
| N35 | 0–10 | ≦5 |

Preferably the margarine fat blend does not contain animal fat like tallow, lard and butter. The margarine fat blend may contain unhydrogenated marine oil, e.g. fish oil of sardines, but most preferably, the margarine fat blend consists of fat originating from vegetable sources.

The fat phase of the spread may comprise apart from the margarine fat, small amounts of additives e.g. lecithin, monoglyceride, β-carotene colourant, vitamins, flavours, other emulsifiers like polyglycerol ester, protein powders and/or salts, etc, which additives often are dissolved in a small amount of oil. The fat of the fat phase consists essentially, which means at least 95%, preferably at least 97%, of the present margarine fat blend.

In order to produce a spread, i.e. a plastic fat or shortening the fat phase can be processed as such without aqueous phase, e.g. by subjecting the molten fat phase to cooling and working e.g. in a Votator line. The resulting plastic fat or shortening can be used e.g. for cooking or baking.

Preferably, the spread also comprises an aqueous phase. Apart from water the aqueous phase may comprise milk components, e.g. proteins and/or lactose, preservatives, flavour, food grade acid, gelling agents and thickening agents.

The continuous phase of the spread preferably is the fat phase while the aqueous phase is present as the dispersed phase finely distributed in the fat phase. The spread preferably comprises 15–85% of fat phase and 15–85% of aqueous phase. More preferably the spread consists of 30–83% fat phase and 17–70% aqueous phase.

EXAMPLE

A fat was prepared by randomly interesterifying a mixture of 65 weight parts high lauric rapeseed oil and 35 weight parts of fully hydrogenated soybean oil. Before the reaction the mixture of oils was dried for 1 hour at 130° C. under a vacuum of 1 mbar. The interesterification was carried out using 0.06% sodium methylate as catalyst, for 20 minutes at 110° C. and at 1 mbar pressure. Subsequently, the reaction mixture was washed with water at 90° C. until the wash water was neutral, and the fat was further refined in a conventional manner. Table IV shows the properties of the starting fats and Table V of the resulting fat.

TABLE IV

| fatty acids | High lauric rapeseed oil | Fully hydrogenated soybean oil |
| --- | --- | --- |
|  | wt. % | |
| C8 | 0 | 0 |
| C10 | 0 | 0 |
| C12 | 38.0 | 0 |
| C14 | 4.1 | 0.1 |
| C16 | 2.8 | 10.9 |
| C18 | 1.3 | 87.3 |
| C18:1 | 33.4 | 0.3 |
| C18:2 | 11.4 | 0 |
| C18:3 | 6.9 | 0 |
| others | 2.1 | 1.4 |
| Total trans | 0 | <0.5% |
| Total SAFA |  | 99.8% |
| of which C16–C18 |  | 87.8% |
| only C16 |  | 10.9% |
| Total C16–C18 |  | 98.6% |

TABLE V

| Interesterified fat | |
| --- | --- |
| N10 | 73.3 |
| N20 | 46.0 |
| N30 | 17.0 |
| N35 | 7.4 |

Two margarine fat blends were prepared by blending the interesterified fat with refined rapeseed oil. See table VI.

TABLE VI

| | Margarine fat blends | |
| --- | --- | --- |
| | Margarine fat A | Margarine fat B |
| Interesterif. fat | 50 wt. % | 57 wt. % |
| Rapeseed oil | 50 wt. % | 43 wt .% |
| KN | 10.5 | 13.2 |
| Trans content | <1% | <1% |
| N10 | 30.0 | 35.3 |
| N20 | 14.9 | 18.8 |
| N30 | 5.1 | 6.4 |
| N35 | 2.4 | 2.4 |

The fat phase and the aqueous phase of the margarines have the following composition:

| Fat phase: | |
| --- | --- |
| 80 parts | margarine fat blend (table VI) |
| 0.2 parts | monoglyceride |
| 0.1 part | lecithin |
| p.m. | β-carotene colourant |
| Aqueous phase: | |
| 18 parts | water |
| 2 parts | whey powder |
| 0.1 part | salt |
| p.m. | citric acid to pH 4.4 |

The aqueous phase and the fat phase are combined, until processing kept at a temperature of 50° C. and then processed through a conventional Votator line to obtain a fat continuous spread with a dispersed aqueous phase. The product obtained with fat A is filled into tubs. The product obtained with fat B is firm enough to be packed in wrappers.

What is claimed is:

1. Edible vegetable fat, substantially free of trans saturated fatty acid residues and suitable for use in the preparation of a spread, consisting of an interesterified mixture of 30–90% of high lauric rapeseed oil, and 10–70% of an oil A comprising at least 40% of saturated fatty acid residues of which saturated fatty acid residues at least 80% are C16–C18 fatty acid residues and at most 60% are C16 fatty acid residues, the fat having N lines which are:

|     |       |
| --- | ----- |
| N10 | 30–90 |
| N20 | 15–60 |
| N30 | 2–30  |
| N35 | 0–15. |

2. Fat according to claim 1 wherein the high lauric rapeseed oil is unhydrogenated high lauric rapeseed oil.

3. Fat according to claim 1, wherein the mixture comprises 40–80% of high lauric rapeseed oil.

4. Fat according to claim 1, wherein the high lauric rapeseed oil comprises 20–75% of lauric acid residues.

5. Fat according to claim 1, wherein the oil A comprises 0–60% of saturated fatty acid residues.

6. Fat according to claim 1. wherein of the saturated fatty acid residues of oil A 0–40% are C16 fatty acid residues.

7. Margarine fat comprising 0–10% of trans unsaturated fatty acid residues and consisting of:

- 20–100% of fat according to claim 1,
- 0–80% of liquid oil,
- 0–40% of a fat selected from the group consisting of palm kernel oil, coconut oil, palm oil, hydrogenated high lauric rapeseed oil, high stearic acid residues containing soybean oil, and sunflower oil.

8. Edible spread comprising a fat phase and an aqueous phase, the fat of the fat phase consisting essentially of margarine fat according to claim 7.

9. A spread according to claim 8 comprising a fat phase and an aqueous phase.

10. The edible vegetable fat according to claim 1 wherein the interesterified mixture of high lauric rapeseed oil comprises 7–40% of lauric acid residues.

11. The edible vegetable fat according to claim 1 wherein the interesterified mixture of high lauric rapeseed oil comprises 10–32% of lauric acid residues.

* * * * *